(12) United States Patent
Kaiser (10) Patent No.: US 10,343,099 B2
(45) Date of Patent: Jul. 9, 2019

(54) FILTER DEVICE

(71) Applicant: Mahle International GmbH, Stuttgart (DE)

(72) Inventor: Sven A. Kaiser, Waiblingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/066,667

(22) PCT Filed: Dec. 16, 2016

(86) PCT No.: PCT/EP2016/081540
§ 371 (c)(1),
(2) Date: Jun. 27, 2018

(87) PCT Pub. No.: WO2017/114669
PCT Pub. Date: Jul. 6, 2017

(65) Prior Publication Data
US 2019/0015769 A1    Jan. 17, 2019

(30) Foreign Application Priority Data

Dec. 28, 2015 (DE) .................. 10 2015 226 754

(51) Int. Cl.
*B01D 29/01* (2006.01)
*B01D 46/10* (2006.01)
(Continued)

(52) U.S. Cl.
CPC ........... *B01D 46/10* (2013.01); *B01D 35/303* (2013.01); *B01D 35/308* (2013.01); *B01D 35/34* (2013.01);
(Continued)

(58) Field of Classification Search
CPC .............. B01D 29/01; B01D 46/0002; B01D 46/0021; B01D 46/10; B01D 46/0006;
(Continued)

(56) References Cited

U.S. PATENT DOCUMENTS 7,976,619 B2 *   7/2011  Huff .................. B01D 46/0036
                                                  55/385.3
8,287,614 B2 *  10/2012  Gillispie ............... B01D 46/10
                                                  55/385.3
(Continued)

FOREIGN PATENT DOCUMENTS

DE    11 2010 001 567 T5    9/2012
DE    11 2012 000 443 T5   10/2013
(Continued)

*Primary Examiner* — Amber R Orlando
*Assistant Examiner* — Minh Chau T Pham
(74) *Attorney, Agent, or Firm* — Fishman Stewart PLLC (57) ABSTRACT

A filter device may include a housing including a first housing part and a second housing part which define a chamber through which a fluid is flowable. The device may also include a filter insert arranged in the housing and configured to filter the fluid. The filter insert may include a seal. The second housing structure may be configured as a web. A circumferential section of the second housing structure may include a contour. The contour may include a recess configured as an interruption in an area of the web. The device may further include a support element arranged on the filter insert interacting with the second housing structure in an area of the contour. The second housing structure may press the first sealing surface against the first housing structure via the support element to seal a clean side from an unfiltered side.

20 Claims, 3 Drawing Sheets

(51) Int. Cl.
*B01D 46/00* (2006.01)
*B01D 35/30* (2006.01)
*B01D 35/34* (2006.01)

(52) U.S. Cl.
CPC .......... *B01D 46/009* (2013.01); *B01D 35/306* (2013.01); *B01D 2265/026* (2013.01); *B01D 2271/022* (2013.01)

(58) Field of Classification Search
CPC .............. B01D 46/002; B01D 46/0001; F02M 35/02425; F02M 35/02491
USPC ...... 55/385.3, 489, 483, 501, 502, 498, 484, 55/493, DIG. 31, DIG. 5; 210/483
See application file for complete search history.

(56) References Cited

U.S. PATENT DOCUMENTS

| | | | |
|---|---|---|---|
| 9,359,982 B2 | 6/2016 | Oh | |
| 2008/0083200 A1* | 4/2008 | Gruber | B62J 37/00 55/385.3 |
| 2010/0258493 A1* | 10/2010 | Kindkeppel | B01D 29/01 210/235 |
| 2012/0304605 A1* | 12/2012 | Enderich | B60K 13/02 55/385.3 |
| 2013/0305930 A1* | 11/2013 | Oh | B01D 46/0002 96/385 |
| 2014/0053521 A1* | 2/2014 | Muenkel | B01D 46/0021 55/489 |
| 2014/0090344 A1* | 4/2014 | Wagner | F02M 35/02491 55/502 |
| 2014/0251895 A1* | 9/2014 | Wagner | F02M 35/02425 210/483 |
| 2014/0260143 A1* | 9/2014 | Kaiser | B01D 46/10 55/501 |
| 2015/0007533 A1* | 1/2015 | Hasenfratz | B01D 46/0006 55/467 |
| 2015/0013293 A1* | 1/2015 | Wagner | B01D 46/10 55/502 |
| 2016/0074794 A1* | 3/2016 | Sudermann | B01D 46/002 55/484 |
| 2016/0074797 A1* | 3/2016 | Suzuki | B01D 46/0002 55/502 |
| 2017/0001134 A1* | 1/2017 | Rieger | B01D 46/0001 |

FOREIGN PATENT DOCUMENTS

| | | |
|---|---|---|
| DE | 10 2013 003 753 A1 | 9/2014 |
| EP | 2 774 667 A1 | 9/2014 |
| WO | 2013/104 791 A1 | 7/2013 |
| WO | 2013/104 792 A1 | 7/2013 |
| WO | 2013/139992 A1 | 9/2013 |

\* cited by examiner

FILTER DEVICE

CROSS-REFERENCE TO RELATED APPLICATIONS

This application claims priority to International Patent Application No. PCT/EP2016/081540, filed on Dec. 16, 2016, and German Patent Application No. DE 10 2015 226 754.7, filed on Dec. 28, 2015, the contents of both of which are hereby incorporated by reference in their entirety.

TECHNICAL FIELD

The present invention relates to a filter device comprising a filter insert.

BACKGROUND

With the help of filter devices, it is possible to filter a fluid, for example a liquid or a gas. In the context of the filtering, the corresponding fluid is freed for example from dirt particles and/or unwanted components are separated from the fluid. Generic filter devices hereby have two-part housings, in which a corresponding filter insert for filtering the fluid is arranged and through which the fluid to be filtered flows. To seal an unfiltered side of the filter device, on which the fluid to be filtered flows into the filter device, from a clean side, into which the filtered fluid flows, such filter inserts on principle have a seal, which extends on the edge side of the filter insert in a circumferential direction. The seal thereby interacts with corresponding structures of the housing. The seal is hereby pressed, i.e. compacted or compressed, respectively, under elastic deformation, to attain said sealing.

DE 11 2012 000 443 T5 shows such a filter device. The filter device has a housing comprising a lower shell, a cover shell, and a filter insert, which is arranged in the housing. The filter insert has a frame element, in which a filter material is accommodated, and which has an end-side flange, which holds a seal. The seal abuts on circumferential edges of the lower shell and of the cover shell.

WO 20137104792 A1 shows a filter device comprising a two-part housing, in which a filter insert is arranged. The filter insert has a rectangular basic shape comprising corners, which are rounded to the outside, as well as a circumferential seal, which follows the course of the filter insert and abuts on both housing parts.

A filter device is known from WO 2013/139992 A1, which has a two-part housing, in which a filter insert is arranged. The filter insert has a circumferential seal, which abuts on the edges of the housing parts.

Such filter devices are used in a variety of applications, for example in motor vehicles, and for filtering a plurality of different fluids. Depending on the type of use and the nature of the fluid to be filtered, it is thereby required to adapt the filter insert accordingly. Through this, a broad spectrum of filter inserts exists, which are in each case adapted to corresponding demands. The presence of filter inserts, which are adapted to different demands, harbors the risk that an unsuitable filter insert is inserted into a corresponding filter housing. The use of such an unsuitable filter insert can hereby lead to an insufficient filter impact, an incorrect, i.e. in particular unwanted filter effect, as well as to damages to the filter device and/or the corresponding use.

SUMMARY

The present invention thus deals with the problem of providing an improved or at least different embodiments for a filter device comprising a filter insert, which is in particular characterized by a prevention or at least a reduction of the use of unsuitable filter inserts in the filter device.

According to the invention, this problem is solved by means of the subject matter of the independent claim(s). Advantageous embodiments are the subject matter of the dependent claim(s).

In the case of a filter device comprising a housing and a filter insert arranged in the housing, the present invention is based on the general idea of equipping the housing with a contour having a recess and of equipping the filter insert with a corresponding support element, which interact to seal the filter device. The contour and the support element are hereby adapted to one another such that a sufficient sealing is possible when using filter inserts comprising suitable support elements, i.e. which are adapted to the contour. The use of unsuitable filter inserts in the filter device is thus prevented or at least reduced. By means of different embodiments of the contours as well as of the support elements, which match the respective contour, it is in particular possible to use filter devices, which are adapted to different demands, comprising correspondingly adapted filter inserts. In particular the use of unsuitable filter inserts in the filter housing is prevented or at least reduced through this. In the case of symmetrically embodied filter inserts, for example filter inserts comprising a rectangular basic shape, the sides thereof, which face away from one another and which can be flown through, also have the same shape, a twisted mounting of the filter insert is prevented, or the corresponding risk is at least reduced. It is thus prevented that the filter insert is flown through incorrectly or improperly, respectively. The desired filter effect is attained through this. In addition, conditional negative impacts on air mass sensors, which may be present, in particular of the filter device, are thus also at least reduced. The specified adaptation of the filter device thereby occurs by means of a corresponding embodiment of the support element and thus on the filter insert side. The intended and thus proper operation of the filter device results from the interaction of this specification on the filter insert side with the housing-side contour, in which the filter device filters the fluid to be filtered accordingly. A corresponding support element in the housing thus ensures that adapted, that is, suitable filter inserts, which still ensure a desired function of the filter device, are in each case used in response to the mounting of the filter insert and/or in response to future replacement of the filter insert.

According to the idea of the invention, the filter device has the housing, which has a first housing part and a second housing part, which define a chamber of the housing, which can be flown through. For the sake of simplicity, the first housing part will hereinafter be identified as upper housing part, while the second housing part will be identified as lower housing part. It is clear, however, that these terms do not result in any limitation whatsoever of the spatial arrangement of the housing parts. This means that the housing parts can be arranged in the chamber in any way, provided that the define the chamber, which can be flown through. Upper housing part and lower housing part can thereby preferably be moved relative to one another such that the filter insert can be inserted into the housing and can be removed from the housing. In other words, the filter device, in particular the housing, is embodied such that the filter insert can be replaced. The filter insert is arranged in the housing and a fluid to be filtered, which flows through the chamber, can flow through it. To seal a clean side arranged downstream from the filter insert from an unfiltered side arranged upstream of the filter insert, the filter insert is provided with a seal, which is arranged on the edge side of the filter insert and which extends in a circumferential direction of the filter insert. For sealing purposes, the seal hereby interacts with structures on the housing side, wherein the seal has a second sealing surface, which abuts on a second housing structure of the lower housing part. The second sealing surface and the second housing structure will subsequently be referred to as lower sealing surface or lower housing structure, respectively, according to the designation of the second housing part as lower housing part. The seal also has a first sealing surface facing away from the lower or second sealing surface, respectively, which abuts on a first housing structure of the upper housing part. The first sealing surface and the first housing structure will subsequently be referred to as upper sealing surface or upper housing structure, respectively, according to the designation of the first housing part as upper housing part. For sealing purposes, the seal is thereby pressed by the housing structures, i.e. in particular elastically compacted or compressed, respectively. According to the invention, it is provided for the contour comprising the recess to be provided in a circumferential section of the lower housing structure, wherein the support element is provided on the filter insert and interacts with the lower housing structure in the area of the contour such that the lower housing structure presses the upper sealing surface against the upper housing structure via the support element for sealing purposes. As a result, no or an insufficient pressing of the upper sealing surface against the upper housing structure takes place when using an unsuitable filter insert, that is, in particular when using a filter insert comprising a support element, which is not suitable for the specified use of the filter device, so that the use of this unsuitable filter insert in the housing is already noticeable in response to the mounting and can thus be prevented.

The contour is thereby provided in a circumferential section of the lower housing structure. This means that the contour is part of the lower housing structure, wherein the recess of the contour can form an interruption of the housing structure.

It is preferred when the support element is in direct contact with the second housing structure, in particular the contour. This means that the support element contacts the second housing structure or the contour, respectively, directly. The use of the unsuitable filter insert can thus be detected better and can thus be prevented. It is also conceivable that the support element in the recess is in direct contact with the second housing structure or the contour, respectively.

The pressing of the upper sealing surface via the support element preferably takes place in the area rea of the circumferential section, in which the contour is arranged. It is preferred thereby, when the upper sealing surface is pressed evenly against the upper housing structure for sealing purposes. Contour and support element are hereby preferably adapted to one another such that, in the area of the circumferential section, the upper sealing surface is pressed against the upper housing structure with the same pressing pressure as outside of the circumferential section.

On principle, the respective housing structure can be embodied in any way, provided that the seal abuts on the housing structure and the housing structures press the seal for sealing purposes. It is in particular conceivable to embody the respective housing structure as a web or a step or to provide it with at least one web or at least one step, respectively. According to the invention, the second housing structure is thereby embodied as such a web.

The support element can hereby be integrated in the seal. It is preferred thereby when the support element is flush with the seal. This means in particular that the support element does not form an emphasizing of the filter insert, in particular of the seal. The support element is thus geometrically integrated in the seal. Such an integration of the support element in the seal provides in particular the advantage of a simplified storage and/or of a simplified transport of the corresponding filter inserts.

If the support element is integrated in the seal, the support element preferably abuts on the lower housing structure. It is advantageous hereby, when the support element abuts on the lower housing structure in a flush manner. The support element can thereby extend in the circumferential direction across a larger area than the contours, so as to in particular attain a sufficient pressing of the upper sealing surface against the upper housing structure for sealing purposes.

It is also conceivable that the support element sticks out from the filter insert, in particular from the seal. Such an embodiment in particular provides the advantage that an assessment of the matching filter insert can already occur in an optical and/or haptic manner in response to the mounting. The use of unsuitable filter inserts can thus be prevented or at least reduced in a simplified manner. The support element can thereby be embodied as a pin, which sticks out, and the like.

It is particularly preferred, when the contour and the support element are engaged. The support element and the contour thereby interact according to the key-lock principle. As a result of such an interaction of the support element with the contour, the support element engages with the contour and/or vice versa in response to the mounting of the filter insert into the housing. A desired mounting position of the filter insert is thus only attained when said engagement takes place. When using unsuitable filter inserts, that is, in particular in the case of filter inserts comprising a support element, which is not adapted to the contour, the desired mounting position of the filter insert is not attained. In such a case, the filter insert in particular sticks out in the area of the contour and/or of the support element. Accordingly, the use of unsuitable filter inserts can be prevented in a simple manner.

As a result of a corresponding embodiment of the support element, in particular with regard to the geometric embodiment and/or the arrangement, a desired function with regard to the filter function can thus be defined thereby for the respective filter device, wherein a corresponding adaption of the contour to this support element is required for this purpose. In the case of an otherwise substantially identical housing and shape of the filter insert for filtering a specified first fluid, for example a corresponding support element can in each case be provided at filter inserts, which are suitable for the desired filtering of this first fluid, wherein these support elements are identical in particular with regard to their arrangement and/or shape and/or size and/or nature, and thus interact with the housing-side contour in the manner according to the invention. Only filter inserts, which are suitable for filtering this first fluid, can thus be properly mounted in the housing. If the filter device is designated to filter a different, second fluid, a support element can be provided on filter inserts, which are suitable for this purpose, analogously to the above explanation, wherein the support element of these filter inserts differs from the support elements, which are suitable to filter the first fluid, in particular with regard to the arrangement and/or shape and/or size and/or nature. It goes without saying that other components of the filter inserts for the first and the second fluid, which serve for the filtering, can hereby also differ. The filter inserts, which are suitable for the first fluid, can thus not be properly mounted in the filter device of the second fluid, while the filter inserts, which are suitable for the second fluid, cannot be properly mounted in the filter device for the first fluid. The filter inserts with their support elements are thus significant for the interaction according to the invention with the housing and thus with the proper or desired function, respectively, of the filter device.

In particularly preferred embodiments, the support element fills the recess of the contour when the support element and the contour engage. A bypass flow of the fluid to be filtered, which might be present as a result of the recess, is at least reduced through this. It is particularly advantageous hereby, when the recess is filled by the support element so as to form a seal. This means that the support element fills the recess such that a flow through the recess is prevented or at least significantly reduced through this in such a way that the recess is filled so as to form a seal.

On principle, the support element can be arranged in the area of the lower sealing surface of the seal, in order to interact with the lower housing structure, in particular the contour. It is also conceivable to arrange the support element so as to be offset to the seal, in particular to the lower sealing surface of the seal. It is in particular possible through this to uncouple the seal, in particular the lower sealing surface, from the support element, in particular to embody it independently from the support element.

On principle, the contour can be embodied in any way, provided that it has a recess in the lower housing structure. It is in particular conceivable that the contour only consists of such a recess.

It is also conceivable to provide the contour with two such recesses, which are separated from one another. For this purpose, an intermediate part, for example a mandrel, of the lower housing structure, which sticks out in the direction of the lower sealing surface, in particular of the support element, can be provided between the recesses. Embodiments, in which the intermediate part, in particular the mandrel, is flush with the side of the lower housing web facing the seal on the side facing the seal or in which the intermediate part, in particular the mandrel, is aligned with the side of the lower housing structure facing the seal on the side facing the seal, respectively, are thereby preferred. In particular an even pressing of the upper sealing surface is attained through this.

Variations, in which the contour is arranged on the unfiltered side of the filter device, turn out to be advantageous. This means that the recess is provided on the unfiltered side of the filter device. This has the advantage that bypass flows, which may be caused by the recess, are shifted to the unfiltered side, so that the qualitative impact of the filtered fluid is not present on the clean side or is as small as possible. In addition, a sealing on the unfiltered side is less important than the sealing on the clean side.

On principle, the seal and the support element can be made of the same material and can be embodied in one piece or monolithically, respectively. It is in particular conceivable thereby to embody the seal together with the support element. It is in particular conceivable to make the seal and the support element of the same plastic. The filter insert can be produced in a particularly simple and cost-efficient manner through this. It is conceivable in particular in the case of a support element, which engages with the corresponding contour, to embody the support element in one piece with the seal.

It is also conceivable to make the seal and the support element of different materials. It is in particular conceivable to make the seal and the support element of different plastics. It is also conceivable to make the seal of a foam material, for example of polyurethane, and to make the support element of a plastic and/or of a metal.

In preferred embodiments, the support element has a heat expansion coefficient, which substantially corresponds to the heat expansion coefficient of the lower housing structure and/or of the lower housing part. In particular in embodiments, in which the support element and the contour engage with one another, an even thermal expansion or contraction, respectively, of the support element, and of the lower housing structure is attained through this, which ensure the sealing by means of the seal across correspondingly large temperature ranges. Corresponding damages to the filter insert and/or to the housing are also prevented or at least reduced through this.

It is in particular conceivable thereby to make the support element and the lower housing structure, in particular the lower housing part, of the same material. This includes in particular embodiments, in which the support element and the lower housing structure are made of the same plastic.

In preferred embodiments, the support element is embodied such, in particular made of such a material that it has a smaller elasticity than the seal. When the seal interacts with the housing structures, this leads to a smaller deformation of the support element as compared to the seal. In the area of the recess of the contour, a pressing force of the upper sealing surface against the upper housing structure can thus be attained, which is similar to the pressing force of the upper sealing surface against the upper housing structure outside of the circumferential section, in particular corresponds thereto. In particular an even pressing of the upper sealing surface against the upper housing structure is thus attained. The support element is hereby adapted accordingly with regard to its elasticity with respect to the seal.

The contour and thus the circumferential section can be arranged in any way with regard to the lower housing structure. Embodiments, in which the housing contour has at least one corner, wherein the structure, in particular the recess, is arranged in such a corner, are thereby preferred. The corner can hereby be embodied to be sharp as well as rounded.

Analogous to this, the filter insert, in particular the seal, preferably has at least one corner, wherein the support element is arranged in the area of such a corner.

The provision of the contour or of the support element, respectively, in such a corner, provides the advantage that the lack of interaction of the support element with the contour can be determined particularly easily and that the use of unsuitable filter inserts can thus be ruled out more easily.

It goes without saying that it is possible to provide the lower housing structure with a plurality of such contours, which are arranged so as to be distributed, in particular in the circumferential direction. It is also conceivable to also provide the upper housing structure with at least one such contour. It is also conceivable to provide the filter insert with a plurality of support elements. At least one such support element and at least one such contour thereby interact in the manner according to the invention.

It goes without saying that, in addition to the filter device, such a filter insert comprising such a support element also belongs to the scope of this invention.

In addition to the seal, the filter insert thereby has a filter material for filtering a corresponding fluid. Preferred embodiments thereby provide for the filter material to be folded, wherein the folded filter material is surrounded by the seal.

Further important features and advantages of the invention follow from the subclaims, from the drawings, and from the corresponding figure description by means of the drawings.

It goes without saying that the above-mentioned features and the features, which will be described below, cannot only be used in the respective specified combination, but also in other combinations, or alone, without leaving the scope of the present invention.

Preferred exemplary embodiments of the invention are illustrated in the drawings and will be described in more detail in the description below, wherein identical reference numerals refer to identical or similar or functionally identical components.

BRIEF DESCRIPTION OF THE DRAWINGS

In each case schematically.

DETAILED DESCRIPTION

Figure 1:
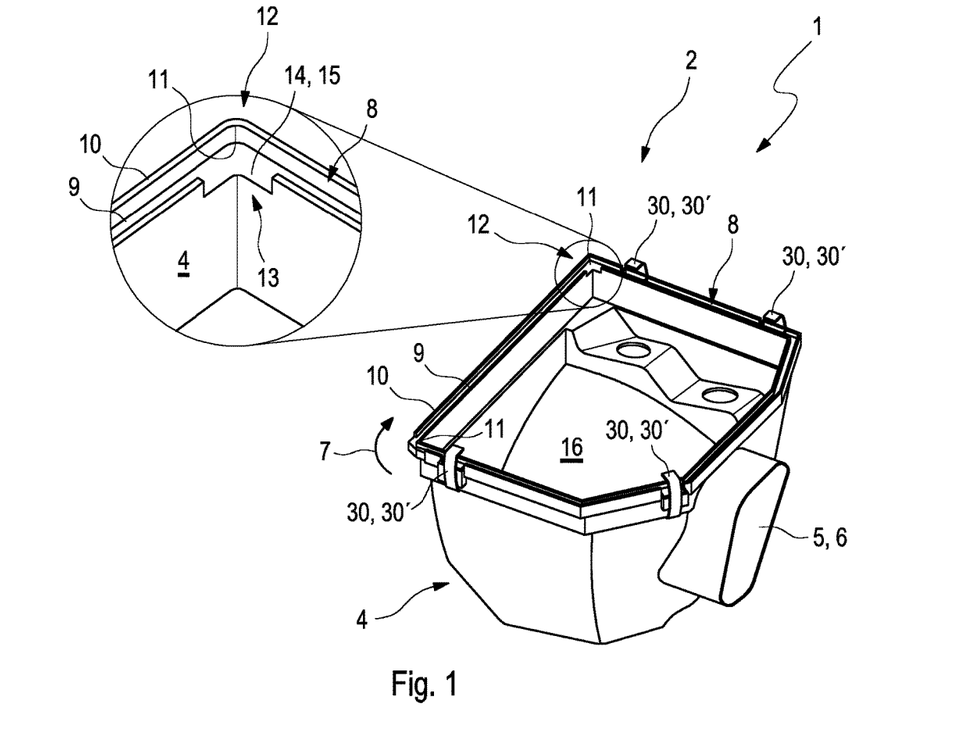
FIG. 1 shows a spatial view of a lower housing part of a housing of a filter device.
Figure 2:
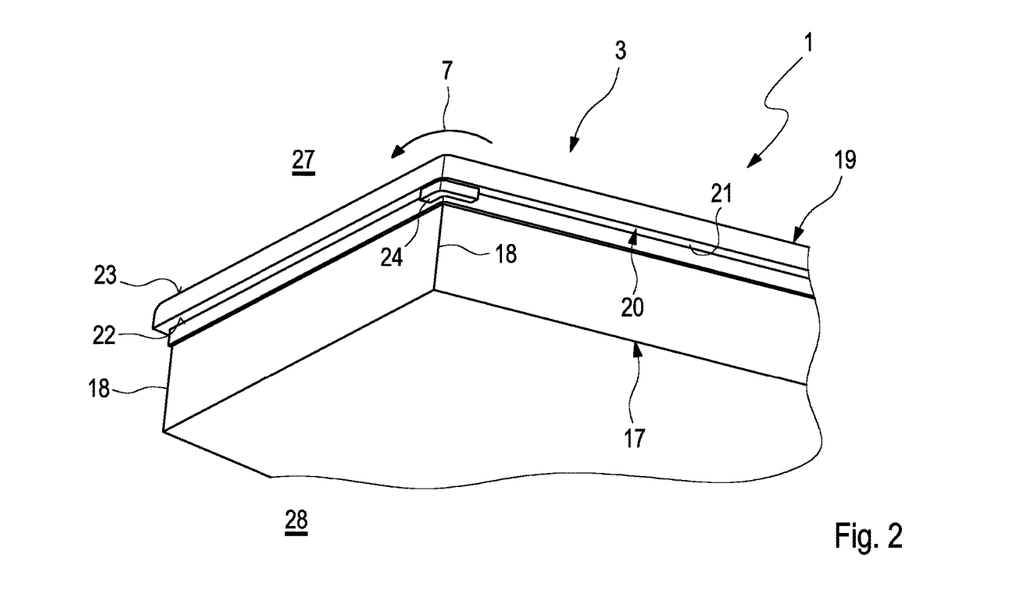
FIG. 2 shows a spatial view of a filter insert of the filter device.

FIGS. 1 and 2 show a filter device 1 in spatial view, wherein a housing 2 of the filter device 1 is shown in FIG. 1 and a filter insert 3 of the filter device 1 is shown in FIG. 2.

According to FIG. 1, the housing 2 comprises a second housing part 4, which is embodied in a cup-shaped manner in the shown example. For the sake of simplicity and without limiting the possible spatial arrangements, the second housing part 4 will be identified as lower housing part 4. A fluidic connection 5, which allows for the flow of a fluid to be filtered by means of the filter device 1 through a chamber 16 of the filter device for filtering purposes, is provided laterally on the lower housing part 4. The connection 5 can for example serve as an inlet 6 for letting the fluid into the filter device 1. Along its edge, the lower housing part 4 has a second housing structure 8, which extends in a circumferential direction 7 and which will be identified below as lower housing structure 8 according to the designation of the lower housing part 4. In the shown example, the lower housing structure 8 is embodied so as to be substantially completely circumferential. The lower housing structure 8 comprises two webs 9, 10, which are spaced apart from one another, wherein the inner web 9 will be identified below as inner web 9 and the outer web 10 as outer web 10. The lower housing part 4 and thus the lower housing structure 8 has a plurality of corners 11, identified below as housing corners 11. In one of these housing corners 11, the lower housing structure 8 is provided in a circumferential section 12 with a contour 13, which follows the course of the corresponding corner 11 and which has a recess 14, which also follows the course of the corresponding corner 11. The recess 14 is provided in the area of the inner web 9 in such a way that the contour 13 can be considered to be an interruption 15 of the lower housing structure 8 or of the inner web 9, respectively.

Figure 3:
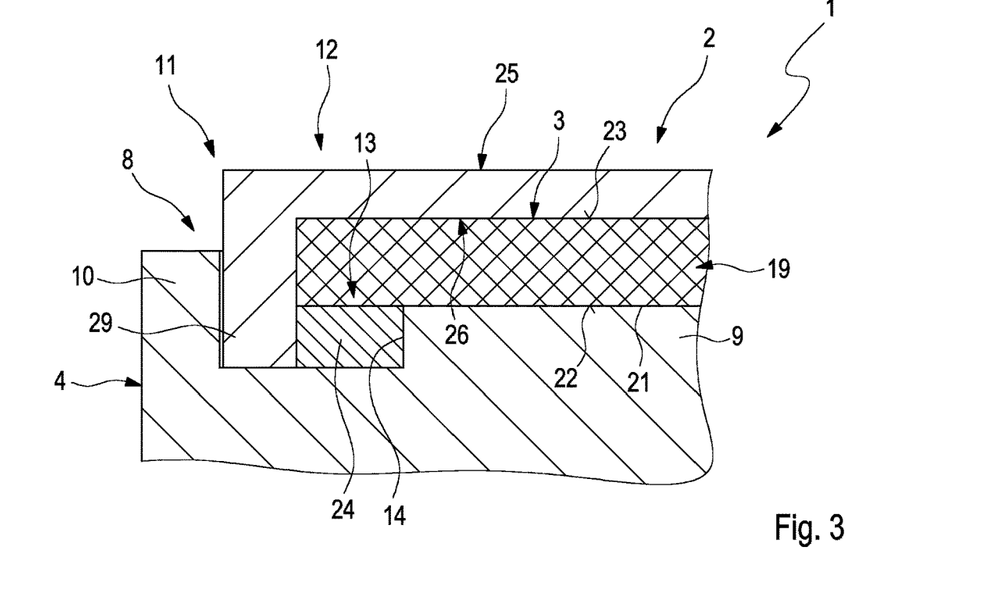
FIG. 3 shows a section through the filter device.

The lower housing part 4 defines the chamber 16, through which the fluid to be filtered can flow and in which the filter insert 3 is arranged (see FIG. 3). The filter insert 3 can thereby be replaced such that the filter insert 3 can be replaced by a new such filter insert 3, as needed.

According to FIG. 2, the filter insert 3 has a filter material 17, which can be folded, for filtering the fluid to be filtered. The filter material 17 is provided with corners 18, which will be identified below as filter corners 18. On the upper edge, the filter material 17 is surrounded by a seal 19, which extends in the circumferential direction 7 and which is provided so as to be continuous or closed, respectively, in the circumferential direction 7 in the shown example. The seal 19 has a sealing section 20, which sticks out, and which sticks out from the seal 19 and forms a step 21. The sealing section 20 has a second sealing surface 22 and a first sealing surface 23, which faces away from the second sealing surface 22. The second sealing surface 22 will be identified as lower sealing surface 22 according to the designation of the lower housing part 4.

A support element 24, which follows the course of the filter corner 18 and which is arranged adjacent to the lower sealing surface 22, in particular following the lower sealing surface 22, is provided in the area of one of the filter corners 18. The support element 24 thereby sticks out from the seal 19 such that it does not protrude beyond the sealing section 20, in particular is flush with the sealing section 20. With regard to its embodiment, the support element 24 is adapted to the recess 14 of the contour 13. This means that with regard to its embodiment, in particular shape and size, the support element 24 corresponds to the recess 14 such that the support element 24 fills the recess 14, preferably so as to form a seal. When the filter insert 3 is installed in the housing 2, the filter corner 18, on which the support element 24 is provided, is to be arranged in the housing corner 11, in which the contour 13 is embodied. This thus leads to an interaction of the support element 24 with the contour 13, as it is illustrated in FIG. 3.

According to FIG. 3, in which a section along the inner web 9 can be seen in the area of the housing corner 11 comprising the contour 13, the housing 2 has, in addition to the second housing part 4 or the lower housing part 4, respectively, a first housing part 25, which, together with the lower housing part 4, defines the chamber 16, which can be flown through. Without limiting the possible spatial arrangements and for the sake of simplicity, the first housing part 25 will be identified below as upper housing part 25. The filter insert 3 is thereby arranged in the housing 2, wherein the lower sealing surface 22 of the seal 19 abuts on the lower housing structure 8, in the shown example on the inner web 9. The upper housing part 25 or the first housing part 25, respectively, which is provided with a corresponding fluidic connection 5, which is not shown here, has a first housing structure 26, which will be identified below as upper housing structure 26 according to the designation of the upper housing part 25. The first sealing surface 23 of the seal 19 thereby abuts on the upper housing structure 26 of the upper housing part 25. The first sealing surface 23 will be identified below as upper sealing surface 23 according to the designation of the upper housing part 25. It can be seen in FIG. 3 that the support element 24 is arranged in the recess 14 of the contour 13. The contour 13 and the support element 24 are thus engaged, wherein in the shown example, the support element 24 engages with the contour 13. Contour 13 and support element 24 thus interact according to the key-lock principle. The support element 24 also fills the recess 14. The seal 19 is hereby pressed by the housing structures 8, 26, so as to seal a clean side 27 arranged downstream of the filter insert 3 (see FIG. 2) against an unfiltered side 28 arranged upstream of the filter insert 3. Accordingly, the contour 13 comprising the recess 14 is arranged on the unfiltered side 28. In the circumferential section 12, the lower housing structure 8 thus presses the upper sealing surface 23 against the upper housing structure 26 via the support element 24 for sealing purposes. In the area of the contour 13 or of the recess 14, respectively, and in the areas outside of the recess 14, the seal 19 is hereby arranged in a substantially flat manner, so that, as a whole, an even pressing of the upper sealing surface 23 against the upper housing structure 26 occurs.

It further follows from FIG. 3 that the upper housing part 25 has a side wall 29, which sticks out in the direction of the lower housing part 4 and which is arranged between the inner web 9 and the outer web 10 in the housing structure 8 such that the outer web 10 laterally surrounds the side wall 29. The outer web 10 is thereby embodied to be higher than the inner web 9.

The pressing of the seal 19 is preferably realized via the housing side 4, 25. For this purpose, the lower housing part 4, as illustrated in FIG. 1, can have connecting means 30 for releasably connecting the housing parts 4, 25 to one another, which connect the housing parts 4, 25 and press them against one another. In the shown example, these connecting means 30 are embodied as clamp 30', which clasp the upper housing part 25.

In the shown exemplary embodiment, the housing 2, in particular the lower housing part 4, and thus the lower housings structure 8, is made of plastic. In addition, the support element 24 is also made of plastic, preferably of the same plastic as the lower housing structure 8. With regard to their heat expansion, the support element 24 and the lower housing structure 8 thus have identical or similar properties, which lead to a better sealing and/or reduced damages. The seal 19 can hereby also be made of plastic, for example of polyurethane.

Due to the arrangement and/or embodiment and/or nature of the support element 24 and the adaptation thereof to the contour 13, the filter insert 3 can only be properly mounted in the matching housing 2 and thus in the matching filter device 1. It is thus possible to provide filter inserts 3 with desired properties, in particular to provide filter inserts 3, which are adapted to the respective use, with a matching such support element 24 in each case, so that these filter inserts 3 can be properly mounted in the housing 2. In other words, other filter inserts 3, which do not have such a support element 24 or such as support element 24 at a position of the filter insert 3, which does not correspond with the contour and/or of another form and/or other size and/or other nature, cannot be properly mounted in the housing 2. It is thus prevented that such filter inserts 3, which are not adapted to the respective use, are inadvertently mounted in the housing 2 and thus lead to insufficient filtering results and/or damages to the filter device 1 or the corresponding use, for example of a corresponding, non-illustrated motor vehicle.

The adaptation of the filter device 1 to the respective use, in particular the use of matching filter inserts 3, can take place by means of a corresponding variation of the support elements 24, in particular with regard to their arrangement and/or shape and/or size and/or nature, thus contours 13 adapted thereto. By means of a corresponding variation of the support elements 24, it is thus possible to provide filter inserts 3, which match this use, for different filter devices 1, which have different fields of application, in each case by means of a corresponding adaptation of the support element 24 to the contour 13, which can be properly mounted only in the matching housing 2.

Figure 4:
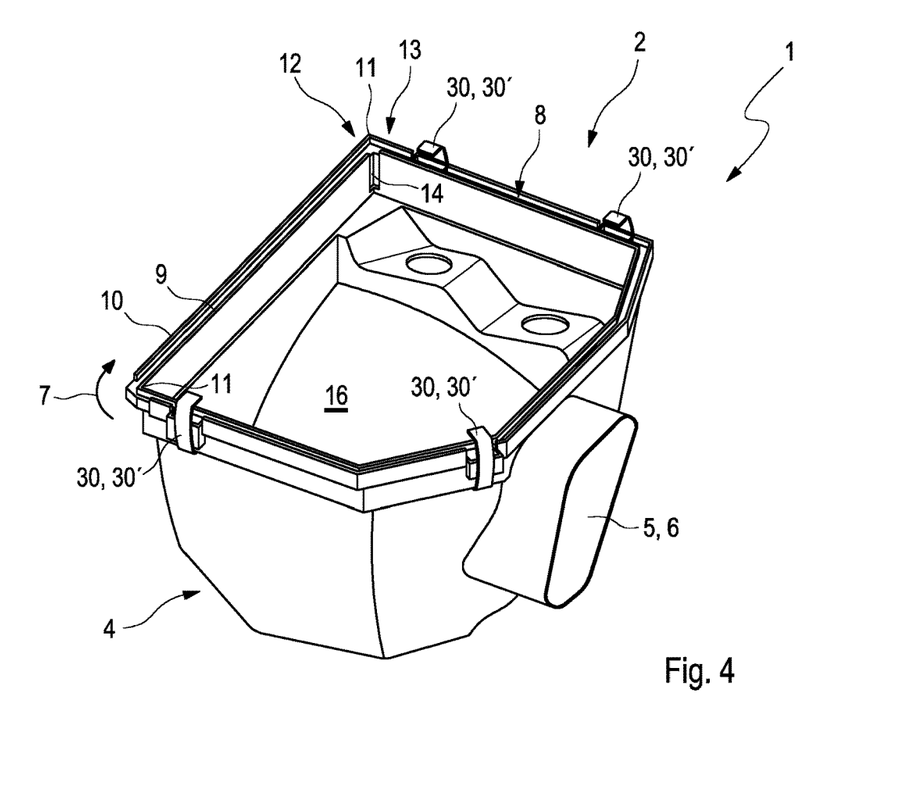
FIGS. 4 and 5 show spatial views of the lower housing part in each case in the case of a different exemplary embodiment.
Figure 5:
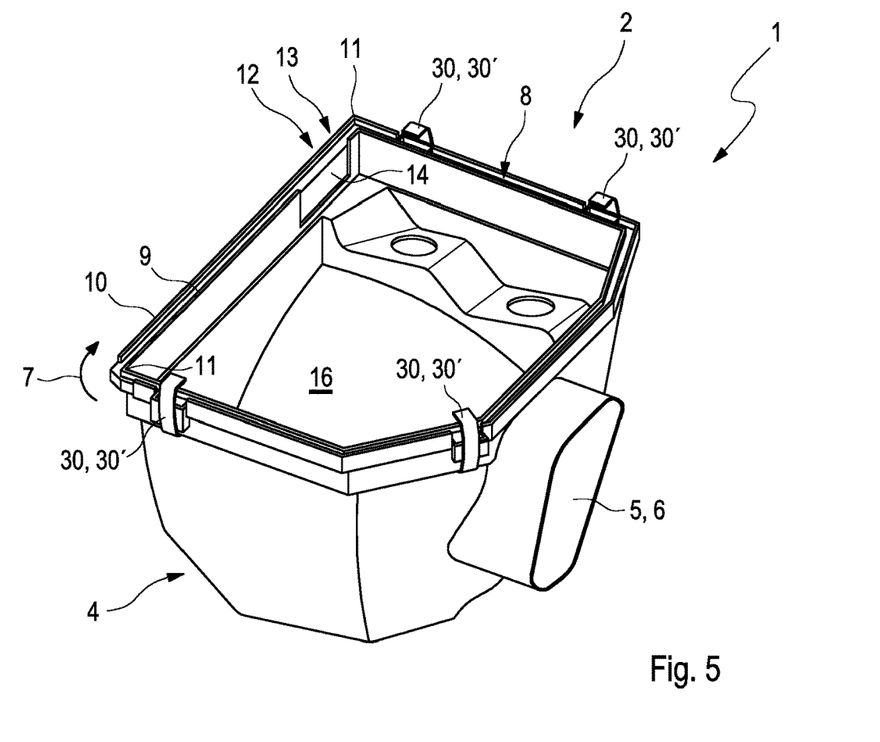

Examples for different embodiments of the contour 13 are illustrated in FIGS. 4 and 5.

Even though the contour 13 is also arranged in the same housing corner 11 of the lower housing part 4 in FIG. 4, the recess 14 of the contour 13 is larger than the contour 13 in FIGS. 1 and 3.

In contrast, the contour 13 of the variation shown in FIG. 5 is arranged offset to the housing corner 11 and is embodied to be larger than the contours 13 of FIGS. 4 and 1 along the lower housing structure 5.

Such a support element 24, which is adapted to the contour 13 comprising the recess 14 from FIG. 5, will thus not fit into the contours 13 of the variations from FIGS. 4 and 2. When using a corresponding filter insert 3, an arrangement of the filter insert 3, which sticks out in the area of the support element 24, would in each case occur in response to the mounting in the housing 4 shown in FIGS. 4 and 1. Vice versa, filter inserts 3, which are adapted to the contour 13 in FIG. 4, cannot be properly mounted in the housing 2 shown in FIG. 5 or in the housing 2 shown in FIG. 1. The same applies for the filter insert 3 shown in FIG. 2, which is adapted to the housing 2, in particular to the contour 13 of the housing 2, in FIG. 1, and which accordingly cannot be properly mounted in the housing 2 shown in FIGS. 4 and 5.

A so-called key-lock principle is thus realized by means of the shown exemplary embodiments, in order to prevent the use of non-adapted or unsuitable filter inserts 3, respectively, in a non-matching housing 2.

Figure 6:
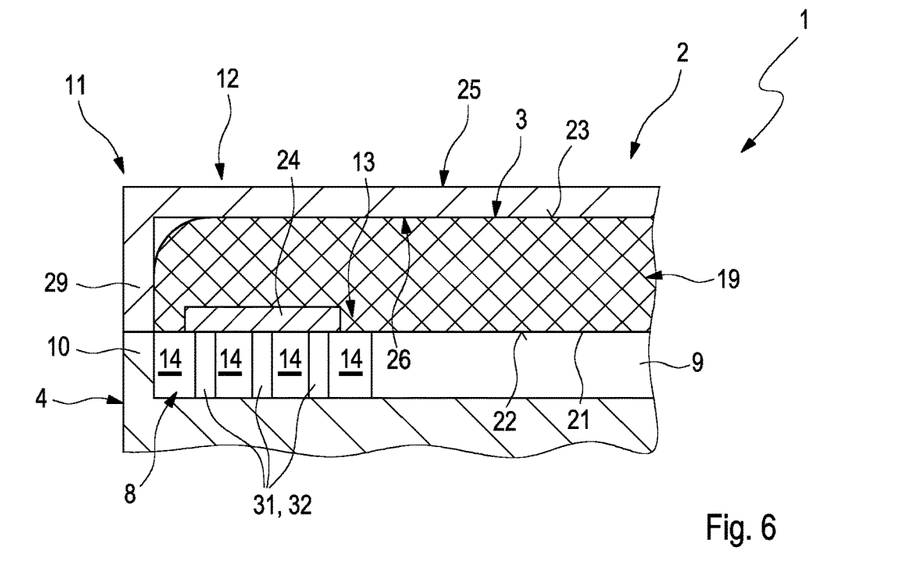
FIG. 6 shows the section from FIG. 3 in the case of a further exemplary embodiment.

FIG. 6 shows the view from FIG. 3 in a different exemplary embodiment of the filter device 1. The filter device 1 shown in FIG. 6 shows such a contour 13 in the housing corner 11 in the lower housing structure 8, which comprises a plurality of such recesses 14, wherein intermediate elements 31, which are in each case embodied as a mandrel 32 in the shown example, are provided between adjacent recesses 14. The height of the respective intermediate element 31 thereby corresponds to the inner web 9 such that the sides of the inner web 9 and of the intermediate elements 31 facing the seal 19 are aligned with one another or are at the same height, respectively.

The support element 24 of the filter insert 3 is thereby integrated in the seal 19 such that the support element 24 is flush with the seal 19, in particular with the sealing section 21. The support element 24 thereby abuts on the intermediate elements 31. The support element 24 is thus integrated in the seal 19 on the side of the lower sealing surface 22. The structure 13 comprising the intermediate elements 31 thereby presses the upper sealing surface 23 of the seal 19 against the upper housing structure 26 via the support element 24 for sealing purposes. In this exemplary embodiment, this also leads to an even pressing of the upper sealing surface 23 against the upper housing structure 26.

It can further be seen in FIG. 6 that the support element 24 does not extend across the entire contour 13 along the circumferential direction 7. In this exemplary embodiment, an engagement is also not provided between the support element 24 and the contour 13. It is conceivable, however, to provide the support element 24 with (non-illustrated) teeth, which engage with the recess 14 of the contour 13.

It can also be seen in FIG. 6 that the height of the outer web 10 substantially corresponds to the inner web 9. The outer wall 29 of the upper housing part 25 thereby abuts on the outer web 10.

In the exemplary embodiment shown in FIG. 6, the support element 24 preferably has an elasticity, which is smaller than the elasticity of the seal 19. In response to the pressing of the seal 19, this does not lead to a deformation or to reduced deformations of the support element 24 or of the seal 19, respectively, in the circumferential section 12, so that an insufficient pressing of the upper sealing surface 23 against the upper housing structure 26 occurs. The support element 24 is in particular embodied such that it evenly distributes the pressing forces, which are transferred via the intermediate elements 31, to the upper sealing surface 23 in the circumferential section 12.

It is conceivable thereby, for example, to make the seal 19 of a foam material, for example polyurethane, while a plastic of smaller elasticity or a metal is used to produce the support element 24.

In the shown examples, the support element 24 is in direct contact with the second housing structure 8 or the contour 13, respectively. In the case of the example shown in FIG. 3, the support element 24 is arranged in the recess 14. In the example shown in FIG. 6, the support element 24 is in direct contact with the contour 13, in particular with the intermediate elements 31 of the contour 13.

The invention claimed is:

1. A filter device comprising:
a housing including a first housing part and a second housing part which define a chamber of the housing through which a fluid is flowable;
a filter insert arranged in the housing and configured to filter the fluid;
the filter insert including a seal extending on an edge side of the filter insert in a circumferential direction configured to seal a clean side arranged downstream from the filter insert from an unfiltered side arranged upstream of the filter insert;
the seal having a first sealing surface and a second sealing surface, the second sealing surface abutting a second housing structure of the second housing part, the first sealing surface facing away from the second sealing surface and abutting a first housing structure of the first housing part;
the seal pressed by the first housing structure and the second housing structure to seal the clean side from the unfiltered side;
the second housing structure configured as a web;
a circumferential section of the second housing structure including a contour, the contour including a recess configured as an interruption in an area of the web;
the second sealing surface abutting the web; and
a support element arranged on the filter insert and interacting with the second housing structure in an area of the contour, wherein the second housing structure presses the first sealing surface against the first housing structure via the support element to seal the clean side from the unfiltered side.

2. The filter device according to claim 1, wherein the support element is integrated in the seal and is flush with the seal.

3. The filter device according to claim 1, wherein the support element sticks out from the filter insert.

4. The filter device according to claim 1, wherein the contour and the support element are engaged.

5. The filter device according to claim 4, wherein the support element fills the recess.

6. The filter device according to claim 1, wherein the support element is arranged offset relative to the second sealing surface.

7. The filter device according to claim 1, wherein the contour includes at least one mandrel sticking out in a direction of the seal.

8. The filter device according to claim 1, wherein at least one of:
the seal and the support element are composed of different materials; and
the support element and the second housing structure are composed of a same material.

9. The filter device according to claim 1, wherein a heat expansion coefficient of the support element substantially corresponds to a heat expansion coefficient of the second housing structure.

10. The filter device according to claim 1, wherein the support element has an elasticity smaller than an elasticity of the seal.

11. The filter device according to claim 1, wherein the seal has at least one corner and the support element is arranged in an area of the at least one corner.

12. The filter device according to claim 1, wherein the support element is in direct contact with the contour.

13. The filter device according to claim 1, wherein the support element protrudes from the seal toward the second housing part and is received in the recess.

14. A filter device comprising:
a housing including a first housing part and a second housing part defining a chamber through which a fluid is flowable, the first housing part including a first housing structure, the second housing part including a second housing structure configured as a web, the second housing structure having a circumferential section including a contour defined by a recess, the recess configured as an interruption in an area of the web;
a filter insert arranged in the housing and configured to filter the fluid;
a seal extending on an edge side of the filter insert in a circumferential direction, the seal having a first sealing surface abutting the first housing structure and a second sealing surface abutting the web of the second housing structure, the first sealing surface and the second sealing surface facing away from one another; and
a support element arranged on the filter insert offset relative to the second sealing surface, the support element sticking out from the filter insert and interacting with the second housing structure in an area of the contour, wherein the support element is engaged with the contour and fills the recess;
wherein the first sealing surface is pressed against the first housing structure via the second housing structure and the support element sealing a clean side arranged downstream from the filter insert from an unfiltered side arranged upstream of the filter insert.

15. The filter device according to claim 1, wherein the support element and the recess are structured and arranged complimentary to one another such that the filter insert operatively seals the first housing part and the second housing part only when the support element is received within and fills the recess.

16. The filter device according to claim 1, wherein the web includes an inner web and an outer web projecting from the second housing part in a direction of the seal, the inner web arranged spaced apart from and radially inside the outer web with respect to the circumferential direction, and wherein at least a portion of the seal and at least a portion of the support element are disposed radially between the inner web and the outer web.

17. The filter device according to claim 16, wherein the recess is configured as an interruption of the inner web.

18. The filter device according to claim 16, wherein the first housing part includes a circumferential side wall projecting toward the seal and arranged between the inner web and the outer web.

19. The filter device according to claim 7, wherein the at least one mandrel includes a plurality of mandrels abutting the support element, and wherein the first sealing surface is pressed against the first housing structure via the plurality of mandrels and the support element.

20. The filter device according to claim 19, wherein the support element includes a plurality of teeth protruding toward the second housing part and arranged between adjacent mandrels of the plurality of mandrels.

* * * * *